United States Patent [19]
Murray et al.

[11] Patent Number: 5,809,492
[45] Date of Patent: Sep. 15, 1998

[54] APPARATUS AND METHOD FOR DEFINING RULES FOR PERSONAL AGENTS

[75] Inventors: LaTondra Alyce Murray, Raleigh, N.C.; Loren Gilbert Terveen, Basking Ridge, N.J.

[73] Assignee: AT&T Corp., Middletown, N.J.

[21] Appl. No.: 769,694

[22] Filed: Dec. 18, 1996

Related U.S. Application Data

[60] Provisional application No. 60/015,070 Mar. 9, 1996.

[51] Int. Cl.$^6$ .................................................. G06F 15/18
[52] U.S. Cl. ............................................ 706/45; 706/60
[58] Field of Search ................... 395/12, 50, 75, 395/76, 62; 706/45, 60, 11

[56] References Cited

U.S. PATENT DOCUMENTS

| | | | |
|---|---|---|---|
| 4,763,277 | 8/1988 | Ashford et al. | 395/62 |
| 4,891,766 | 1/1990 | Derr et al. | 395/12 |
| 5,189,728 | 2/1993 | Yamakawa et al. | 395/76 |
| 5,283,856 | 2/1994 | Gross et al. | 395/50 |
| 5,487,135 | 1/1996 | Freeman | 395/75 |
| 5,566,295 | 10/1996 | Cypher et al. | 345/326 |
| 5,592,590 | 1/1997 | Jolly | 395/75 |
| 5,644,686 | 7/1997 | Hekmatpour | 395/62 |

OTHER PUBLICATIONS

Pattie Maes, *Agents that Reduce Work and Information Overload*, Jul. 1994, 10 pages.

David Canfield Smith, Allen Cypher & Jim Spohrer, *KID-SIM: Programming Agents Without A Programming Language*, Jul. 1994, 13 pages.

Thomas W. Malone–Kum–Yew Lai and Christopher Fry, *Experiments with Oval: A Radically Tailorable Tool for Cooperative Work*, Nov. 1992, 9 pages.

J.C. Sanborn, "A Modifiable Approach to Expert Systems Development," SPIE vol. 786 Applications of Artificial Intelligence V, pp. 99–106, Dec. 1987.

J.–D. Fekete, et al., "GENESE: Narrowing the gap between Experts and Systems," IEEE Engineering in Medicine & Biology Society 11th Int'l. Conf., vol. 6, pp. 1845–1846, Nov. 1989.

*Primary Examiner*—Robert W. Downs

[57] ABSTRACT

An apparatus and method for a user to program a personal software agent using an agent manager. The agent manager receives instructions for creating a rule. The rule is placed in a hierarchical order. A determination is made as to whether the rule is valid within the hierarchical order. If the rule is not valid, repairs are suggested to make the rule valid.

30 Claims, 7 Drawing Sheets

APPARATUS AND METHOD FOR DEFINING RULES FOR PERSONAL AGENTS

CROSS-REFERENCES TO RELATED APPLICATIONS

This application claims the benefit of U.S. provisional application Ser. No. 60/015,070, filed Apr. 9, 1996, entitled "Apparatus and Methods for Defining Rules."

BACKGROUND OF THE INVENTION

The invention relates to an agent manager for personal software agents. More particularly, the invention relates to a method and apparatus for defining rules for personal agents to acquire user-specific knowledge and accomplish user specified tasks.

Personal software agents are computer programs that act on behalf of users to perform routine, tedious and time-consuming tasks. To be useful to an individual user, an agent must be personalized to the individual user's goals, habits and preferences. Thus, there exists a substantial need for the agent to efficiently and effectively acquire user-specific knowledge from the user. Previous attempts to solve this problem, however, prove to be unsatisfactory in many ways.

The concept of agency, or the use of agents, is well established. An agent is a person authorized by another person, typically referred to as a principal, to act on behalf of the principal. In this manner, the principal empowers the agent to perform any of the tasks that the principal is unwilling or unable to perform. For example, an insurance agent may handle all insurance matters for a principal, a talent agent may act on behalf of a performer in arranging concert dates, and a foreign agent may spy on other governments to gather secret information on behalf of his or her government.

With the advent of the computer, a new domain for employing agents has opened up. Significant advances in the realm of artificial intelligence have enabled computer programs to act on behalf of computer users to perform routine, tedious and other time-consuming tasks. These computer programs are referred to as "software agents."

Moreover, there has been a recent proliferation of computer and communications networks. These networks permit a user to access vast amounts of information and services without, essentially, any geographical boundaries. Thus a personal software agent has a rich environment to perform a large number of tasks on behalf of a user. For example, it is now possible for a software agent to make an airline reservation, purchase the ticket, and have the ticket delivered directly to a user. Similarly, a software agent could scan the Internet and World Wide Web (WWW) to retrieve information ranging from the latest sports or news to a particular graduate thesis in molecular biology. A scenario could even be envisioned where a personal software agent automatically checks the weather every morning and changes a users wake-up alarm accordingly, e.g., one-hour later in the case of a snow delay.

To operate effectively, software agents require agent managers to acquire certain information. This information can be generally categorized as: (1) knowledge of the task domains within which the agent is to work; and (2) user-specific knowledge such as a user's preferences, habits and goals.

Knowledge of the task domains within which an agent is to operate is usually supplied by the application developer. Examples of various task domains include electronic messaging, electronic banking or personal financial services. The fundamental ontology, or vocabulary, usually consists of objects and actions. In messaging, for example, objects includes messages, folders, persons and groups. Actions in messaging include moving a message to a folder, forwarding the message to another user, and replying to the sender. Some objects and actions are very general and thus useful in many domains, e.g., notification actions such as popping up a window on a computer screen, placing a call, and paging.

The agent also requires knowledge about it's owners preferences, habits and goals, which is typically supplied by the user. Much of this type of knowledge can be expressed as If-Then rules. Examples of such rules might include:

1. (messaging) If I get a message from by boss with the subject "urgent" after business hours, then notify me by calling my home number.
2. (banking) If the balance in my checking account falls below $500 and the balance in my savings account is above $2000, then transfer $500 from savings to checking.
3. (finances) If the price of XYZ stock falls below $30, buy 100 shares.

The effective acquisition of user-specific knowledge has posed a serious problem in the area of personal software agents. Conventional methods for a software agent managers to acquire user-specific knowledge fall within three broad categories: (1) learning; (2) programming by demonstration (PBD), and (3) end-user programming (EUP). Each of these categories of methods will be discussed in turn.

The learning approach is detailed in a paper by P. Maes titled "Agents that Reduce Work and Information Overload," *CACM* 37, 7 (July 1994), pp. 55–67. The agent learns rules by watching user behavior and detecting patterns and regularities. The agent records a user's activity in terms of situation-action pairs. For example, a situation could be an e-mail message and an action the way the user processed the message. The system predicts how a new situation should be handled by finding the most similar previously seen situation. After seeing enough examples, the system is able to make good predictions, and make suggestions to the user. The user may also instruct the agent to act on its own when the user's confidence in the agent's predictions exceeds a specified threshold.

The problem with the learning method is that the agent manager has a slow learning curve. The agent manager is unable to offer any advice until it has seen a significant number of examples. Further, the agent manager cannot offer assistance in truly new situations since there were no previous examples from which to draw. This limitation can be minimized by permitting one software agent manager to access the experience of another software agent manager. This solution, however, fails to personalize the agent in the preferences, habits and goals of the agent's owner.

The PBD method is discussed in a book by A. Cypher titled "Watch What I Do: Programming by Demonstration," MIT Press, Cambridge, Mass., 1993. In PBD, a user puts a system into record mode to record a user's actions in an executable file. This technique is similar to the macro function on many popular word processors. The prototypical PBD systems operate in domains that have a natural graphical representation. One example is KIDSIM which is outlined in a paper by D.C. Smith et al. titled "KIDSIM: Programming Agents Without a Programming Language," *CACM* 37, 7 (July 1994), 55–67. In KIDSIM, children create simulations in which characters move around in a two-dimensional world. They create rules by using a graphical editor to depict changes of state—that is, they draw the configuration of the world before and after the rule has applied. The system generalizes from the concrete objects in the demonstration to create an abstract rule, e.g., replacing a particular character by any character of a certain type and replacing absolute locations by relative changes in location.

The problem with the personal agents using the PBD method is that there is no mechanism by which the personal agent may determine if rules are incompatible with other rules. Moreover, if there are incompatibilities, the personal agent does not offer solutions for repairing the invalid rule.

The foundational research on end-user programming (EUP) is found in a work by T. W. Malone et al. titled "Experiments with Oval: A radically Tailorable Tool for Cooperative Work," *ACM Transactions on Information Systems* 13, 2 (April 1995), 177–205. A user first indicates the type of object to which the rule applies, such as a message. The user then describes the conditions of the rule by filling out a form that contains a field for each attribute of the object. For messages, the attributes would include sender, subject, recipient, and so forth. Finally, the user specifies the actions of the rule by selecting from a list of all the actions that could apply to this type of object. For example, a message could be moved, copied, forwarded, deleted, and so on.

As with personal agents using the PBD method, traditional personal agents using the EUP method are incapable of determining whether rules are incompatible with other rules, and if so, offering repairs to the rule.

A substantial need, therefore, exists for an agent manager which can acquire user-specific knowledge in the form of rules in a manner which is timely and precise, and which can detect and repair any conflicts with existing rules.

SUMMARY OF THE INVENTION

In view of the foregoing, there exists a need in the art for a method and apparatus for solving the above-stated problems. More particularly, there is a need in the art for a method and apparatus for a personal software agent using enhanced EUP methods to acquire knowledge about a user's habits, preferences and goals using an agent manager. The agent manager allows the user to define new rules, and determines whether such rules conflict with existing rules. If such a conflict exists, the agent manager interactively guides the user in selecting and applying repairs for the new rules to remove the conflict.

Thus, one embodiment of the invention permits a user and agent manager to collaborate in developing and managing a set of rules that embody the user's preferences for handling a wide variety of situations.

This is accomplished using an apparatus and method for defining rules for a personal software agent. One embodiment of the invention includes an agent manager which uses a rule edit module for defining at least one condition and at least one action to form a new rule. The invention uses a rule index module for placing the new rule in a rule hierarchy, wherein the hierarchy is comprised of parent rules, child rules, and sibling rules. The rule index module adds actions from the parent rules to the new rule and from the new rule to the child rules. The rule index module also creates intersection rules from an intersection of the new rule with the sibling rules. The invention uses a rule analysis module for determining whether the new rule and the intersection rules conflict with any existing rules in the hierarchy. The invention uses a rule repair module for repairing the new and intersection rules where such conflicts exist.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figures 1, 2:
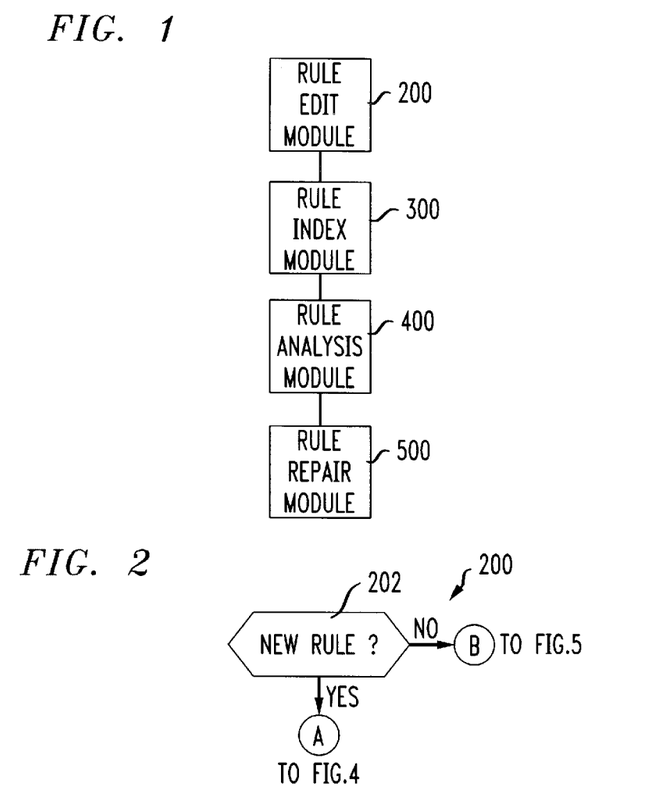
FIG. 1 is a flow diagram illustrating the overall structure of one embodiment of the invention.
FIG. 2 is a flow diagram of a decision-making portion of a rule edit module used in accordance with one embodiment of the invention.

Referring now in detail to the drawings wherein like parts are designated by like reference numerals throughout, there is illustrated in FIG. 1 a flow diagram illustrating the overall structure of one embodiment of the invention. FIG. 1 shows four modules: rule edit module 200; rule index module 300; rule analysis module 400; and rule repair module 500.

The invention relates to an agent manager for personal software agents. More particularly, the invention relates to a method and apparatus for defining rules for personal agents to acquire user-specific knowledge and accomplish user specified tasks.

The invention comprises an agent manager which improves end-user programming by allowing the agent manager to perform the more complicated programming tasks for the user, thereby minimizing programming commands and syntax for the user. The agent manager allows the user to focus on three tasks: (1) define conditions; (2) define attributes; and (3) define actions. Once these three tasks are accomplished, a rule is formed. As a user creates or edits rules, the agent manager analyzes the rules for problems, computes methods of repairing the problems, and guides the user in selecting and applying the repairs.

The agent manager's role is to watch for problems as users create or edit rules and help users to repair problems that it detects. Specifically, the agent manager detects when a rule's plan is not valid, i.e., some action does not apply or the rule conflicts with an existing rule. This can occur either as a user edits a rule or when a new rule is added to a rule hierarchy (due to interactions with other rules, described more fully below). When the agent manager finds an invalid plan, it computes repairs, which are changes to the plan that will make the plan valid. It then presents an interactive explanation that explains the nature of the problem and guides the user in selecting a repair. One embodiment of invention will be discussed in detail using electronic mail as an example.

FIG. 2 is a flow diagram of a portion of a rule edit module used in accordance with an embodiment of the invention. The invention uses rule edit module 200 to specify rule conditions and actions. As shown in FIG. 2, if a user wants to enter a new rule at step 202, the rule edit module performs the actions detailed in FIG. 4. If a user wants to edit an existing rule at step 202, the rule edit module performs the actions detailed in FIG. 5.

Figure 3:
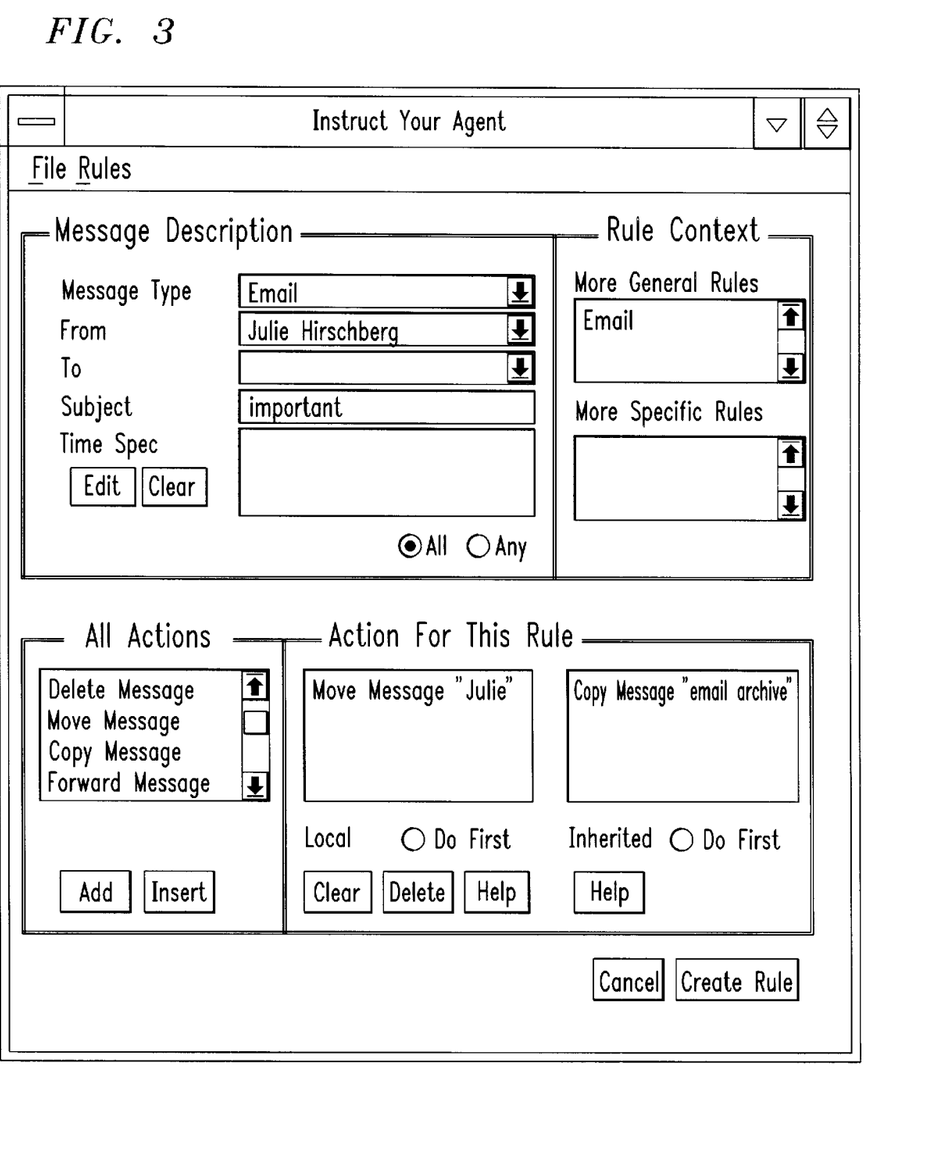
FIG. 3 is a picture of a rule editor used in accordance with one embodiment of the invention.

FIG. 3 is a picture of a rule editor used in accordance with one embodiment of the invention. The following descriptions of FIG. 4 and FIG. 5 may be enhanced by referring to FIG. 3.

Figure 4:
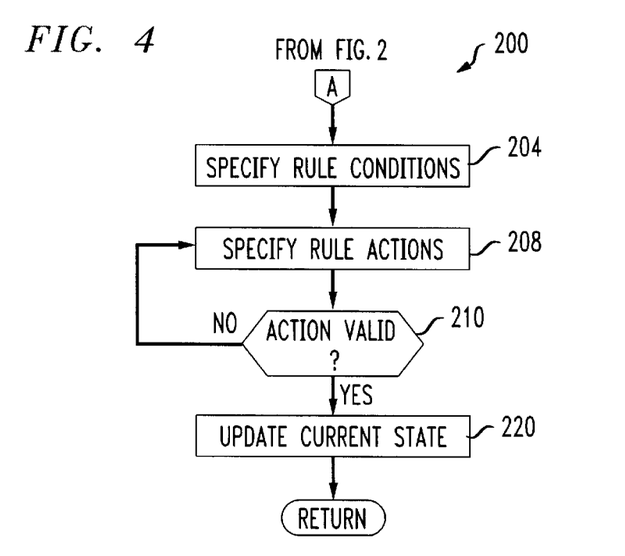
FIG. 4 is a flow diagram of a new rule portion of a rule edit module used in accordance with one embodiment of the invention.

FIG. 4 is a flow diagram of a new rule portion of a rule edit module used in accordance with one embodiment of the invention. At step 204, a user specifies rule conditions, examples of which include restricting the values of the message type, sender, recipient, subject, and the date and time of arrival. By specifying these rule conditions, the user defines the set of messages to which the rule applies. For example, FIG. 3 shows a rule that applies to e-mail messages from Julia Hirschberg whose subject field contains the word "important." As the user specifies the conditions, the system continuously updates and displays the rule's context, i.e., its relationship to other rules and actions the rule will inherit from more general rules (as discussed in reference to FIG. 6).

The user can also specify using rule edit module 200 two types of conditions about the arrival date and time of messages. First, users may specify messages that arrive in a particular interval, such as "between 4:00 p.m. on Sep. 15, 1995 and 8:00 a.m. on Sep. 20, 1995." The user can also specify intervals such as "from November 1995 to March 1996," and "after 5:00 p.m. on Sep. 15, 1995." Second, the user can specify messages that arrive during a particular period, such as "during June, July and August," "on Saturday or Sunday," "between 1800 and 0800," "on the first Monday of each month," and "on the last working day of the month."

As the user enters the conditions at step 204, these conditions define an initial state. The initial state is the class of messages to which the actions apply. For example, the initial state for the rule in FIG. 3 is > InSpool and
> messageType = email and
> sender = Julia-Hirshberg and
> subject contains "important".

This initial state will be transformed as new actions add or delete facts from the initial state.

At step 208, a user selects rule actions. In our e-mail example, the set of actions could include Move Message, Forward Message, Notify by Paging, Notify with Pop Alert, and so forth. As shown in FIG. 3, the rule contains a single action that moves messages to a folder named "julia." The system has determined that one rule named "Email" is more general, and that one action "Copy Message 'email archive,'" will be inherited to this rule (as discussed in reference to FIG. 6).

At step 210, the agent manager tests whether the selected action is permitted by the system in the state in which the specified conditions and previous actions have been applied. If it is, the agent manager updates the current state at step 220. If the action is not permitted, the user is informed and can then select another action, or change the rule conditions.

Figure 5:
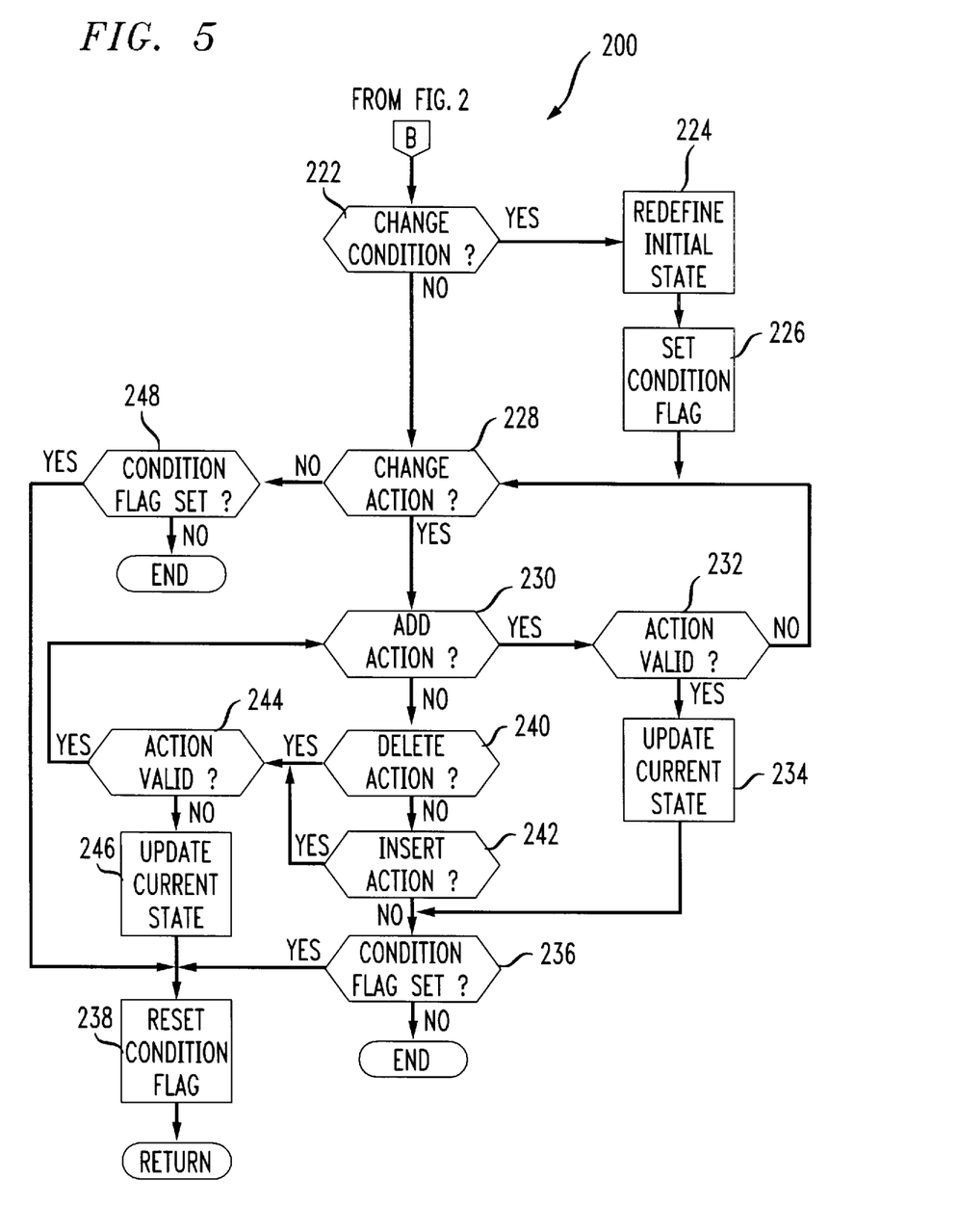
FIG. 5 is a flow diagram of an existing rule portion of a rule edit module used in accordance with one embodiment of the invention.

FIG. 5 is a flow diagram of an existing rule portion of a rule edit module used in accordance with one embodiment of the invention. As shown in FIG. 2, if the user wants to edit an existing rule, the agent manager performs the actions detailed in FIG. 5.

As shown in FIG. 5, the agent manager tests whether there is any change in rule conditions at step 222. If there is, the agent manager redefines the initial state at step 224 and must recheck the validity of the entire plan (as detailed in reference to FIG. 7). The agent manager sets a condition flag at step 226, and tests whether the user has changed any actions at step 228. If at step 222 no changes in the conditions have been detected, the agent manager moves directly to test whether the user has changed any actions at step 228. If the user has not changed any actions at step 228, the agent manager checks whether the condition flag has been set at step 248. If it has, the agent manager resets the condition flag at step 238 and moves to rule analysis module 400. If the condition flag has not been set, the program waits for user input, or the termination of the agent manager.

If the user changes an action at step 228, the agent manager tests whether the user added an action at step 230. If the user has added an action to the end of plan, all that must be checked is that action's applicability, i.e., the action is possible for the selected condition. Thus, at step 232 the added action is tested as to whether it is valid. If it is not, the user is prompted or directed to select another action. Alternatively, the user could select a condition that conforms to the action initially selected. If the action is valid, the agent manager updates the current state of the plan at step 234 and checks to see if the user changed any conditions by checking whether the condition flag was set at step 236. If no conditions were changed, this program module ends, or alternatively, allows the user to make additional edits to the existing or other rule plans. If the condition flag is set at step 236, then the condition flag is reset at step 238 and the program module returns.

If at step 230, the user did not add an action, the agent manager tests whether the user wants to delete or insert an action at steps 240 and 242, respectively. If either action is selected, the agent manager checks at step 244 whether the action is valid. If it is, the agent manager updates the current state of the plan at step 246, resets the condition flag at step 238, and returns. If the action is not valid at step 240 or 242, the program informs the user and prompts the user to perform another action.

Figure 6:
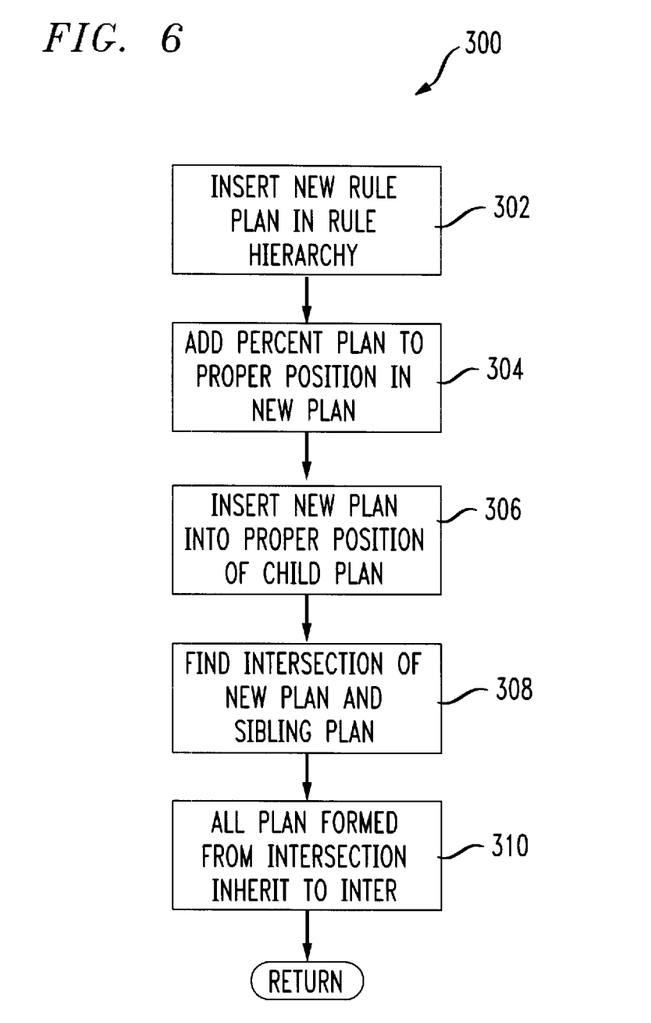
FIG. 6 is a flow diagram of a rule index module used in accordance with one embodiment of the invention.

FIG. 6 is a flow diagram of a rule index module used in accordance with one embodiment of the invention. To better understand how the agent manager indexes rules, it may be helpful to first describe the representation and reasoning technology used by the invention.

The rule representation used in the invention should enable three functions:

1. Determine whether an action may apply in a given context, e.g., to a specified set of messages, or after certain other actions;
2. Determine when one rule subsumes another, that is determine whether the set of objects to which the first rule applies is a superset of the set of objects to which the second rule applies;
3. Determine when two rules intersect, that is determine whether the set of objects to which the first rule applies intersects the set of objects to which the second rule applies.

One example of representing rules in accordance with the invention is through the use of CLASSIC, which is detailed in a paper by A. Borgida et al. titled "CLASSIC: A Structural Data Model for Objects," *SIGMOD* '89, (1989), and a paper by R. J. Brachman titled "Living with Classic: When and How to Use a KL-ONE-Like Language," *Formal Aspects of Semantic Networks,* J. Sowa, Ed., Morgan Kaufmann, Los Altos, Calif., 1990, both of which are herein incorporated by reference in their entirety.

CLASSIC is a description logic. As such, it permits users to create structured descriptions of sets of objects (known as concepts) and individual objects. As with any standard knowledge representation or object-oriented language, users may state hierarchical relationships between concepts. The main service provided by CLASSIC, however, is to determine subsumption relationships automatically by analyzing concept descriptions.

Determining subsumption relationships is a key requirement for the invention. The invention uses CLASSIC to automatically maintain a rule hierarchy. For example, the conditions of the rule being edited in FIG. 3 would be represented in CLASSIC as the following concept (referred to as $C_0$):

```
C0 - messageType = email and
     sender = Julia-Hirschberg and
     subject contains "important"
```

Examples of concepts that subsume $C_0$ include concepts formed from a subset of its conjuncts, such as "messageType=email" (the more general rule shown in FIG. 3) or "sender=Julia-Hirschberg." The object hierarchy is in use, so "messageType=Message" also subsumes $C_0$. In addition, the semantics of substrings are used, so a concept like "subject contains 'port'" also subsumes $C_0$.

CLASSIC also determines the intersection between two concepts. This is useful because users often state general rules that categorize messages by a single attribute, such as:

```
sender = Julia-Hirschberg
subject contains "important."
```

CLASSIC determines whether these rules intersect. The intersection between these two rules is the conjunction of the two concepts. In general, however, CLASSIC may have to combine parts of two concepts to determine the intersection. For example, consider the two descriptions of message arrival times "between 12:00 on Nov. 8, 1995 and 12:00 on Nov. 10, 1995" and "between 18:00 and 8:00." CLASSIC determines that the intersection is "18:00 to 23:59 on Nov. 8, 1995, midnight to 8:00 and 18:00 to 23:59 on Nov. 9, 1995, and midnight to 8:00 on Nov. 10, 1995."

Like rule conditions, rule actions are represented as CLASSIC concepts. Actions are described in terms of a basic artificial intelligence (AI) planning model. Each action applies in a particular "state of the world," represented as a list of facts, and each action may change the state of the world. Thus, an action is defined in terms of its preconditions (facts which must be true for the action to be applied), add list (facts added by the actions), and delete list (facts deleted by the action). For example, the action PickupCall is defined as:

```
preconditions: TelephoneCall
add: CallPickedup
```

If an action $A_1$ occurs in a plan before an action $A_2$, and $A_1$ deletes a precondition of $A_2$, then $A_1$ defeats $A_2$.

AI planning research explores planning synthesis (creating a plan that transforms a specified initial state to a specified final state) and recognition (inferring an agent's plan by observing his/her/its actions), both of which are very difficult computational problems. By way of contrast, the invention allows the user to construct a plan, i.e., the actions of a rule. Thus the agent manager need only check plan validity, which is a much less expensive (in terms of CPU cycles) computational task.

Thus, as shown in FIG. 6, the agent manager inserts the new rule defined by the user into a rule hierarchy at step 302. One way to establish a rule hierarchy is to use CLASSIC. The plan from parent rule PARENT is inherited to the new plan NEW and added at the proper position in NEW's plan at step 304. NEW's plan is inherited to its child CHILD and inserted in the proper position, i.e., after the local plan of CHILD and before the more general plan of PARENT, at step 306. The intersection INTER of NEW and its sibling rule SIBLING is formed at step 308, and all the appropriate plans are inherited to INTER at step 310. It is worthy to note that the user only becomes aware of INTER if some action in its plan is defeated. All the composed plans are checked for validity by rule analysis module 400, and whenever any actions of rule's plan are defeated, the display of the rule is updated to reflect this fact.

Figure 7:
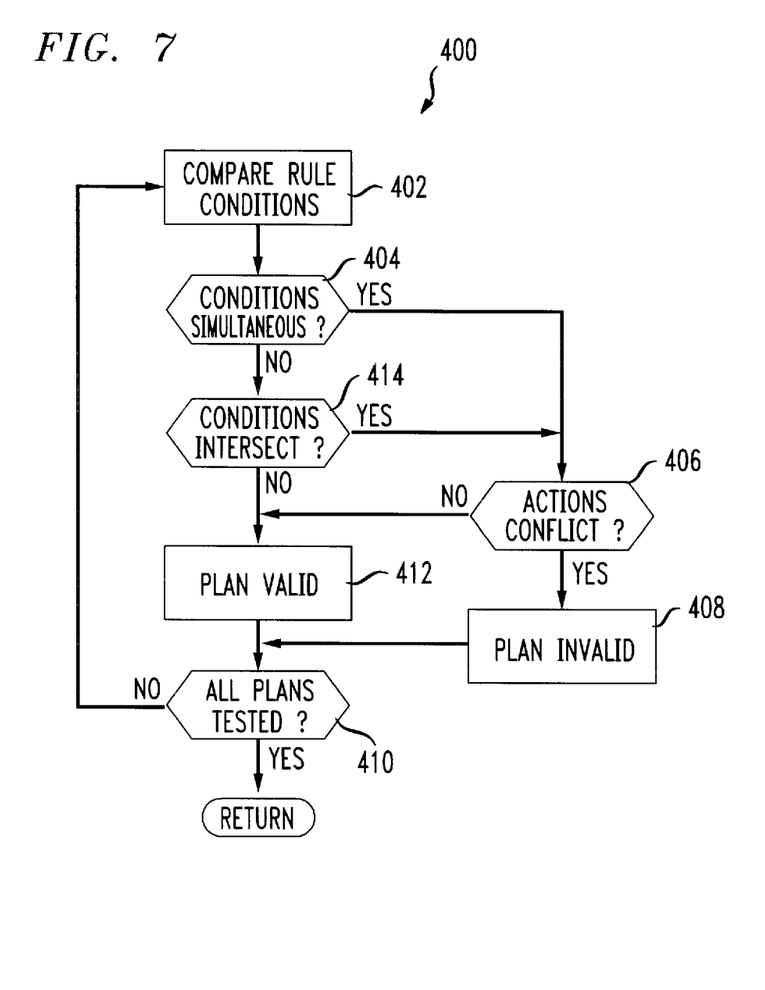
FIG. 7 is a flow diagram of a rule analysis module used in accordance with one embodiment of the invention.

FIG. 7 is a flow diagram of a rule analysis module used in accordance with one embodiment of the invention. The rule analysis module 400 of the agent manager detects when a rule's plan is not valid, i.e., some action does not apply. This can occur either as a user edits a rule or when the rule is added to the hierarchy. When the agent manager finds an invalid plan, it computes repairs, which are changes to the plan that will make the plan valid. It then presents an interactive explanation that explains the nature of the problem and guides the user in selecting a repair.

The task of verifying plan validity centers around the notion of current state. The conditions of a rule define an initial state that is the class of messages to which the actions apply. Each action transforms the initial state by adding or deleting facts. For example, the initial state for the rule in FIG. 3 is:

```
InSpool and
messageType = email and
sender = Julia-Hirshberg and
subject contains "important."
```

InSpool is a special tag indicating that the message has not yet been disposed of, i.e., deleted or moved to a folder. All actions have at least one precondition— InSpool—which is the one fact in delete list of "Move Message." Thus, adding a "Move Message" action results in the removal of InSpool from the current state. If any other actions are subsequently added to the rule, the system will find that they do not apply.

The system has to update the current state whenever an action is added, deleted or inserted, or when the conditions are changed, as described previously in reference to FIG. 5. When an action is added to the end of the plan, all that has to be checked is that action's applicability. Changing the conditions redefines the initial state, so the validity of the whole plan must be rechecked. When an action is inserted into or deleted from the middle of the plan, the whole plan again is checked. Alternatively, the checking could begin from the insertion/deletion point by keeping a record of previous states.

As a user edits a rule, the agent manager continuously recomputes its position in the rule hierarchy, thus determining the actions to inherit to the rule from more general rules. Either the locally defined or the inherited actions of a rule may be done first. If the user has not specified an order, the system will prefer the local-first ordering, but if this results in an invalid plan, it will try inherited-first. For example, in FIG. 3, if the local "Move Message" action were ordered before the inherited "Copy Message" action, the plan would be invalid, so the invention selected the inherited-first ordering.

When a rule is added to the hierarchy, the Agent Manager inherits its plan to all more specific rules. It also considers rules resulting from the intersection of the new rule and its sibling rules. These cases all result in new plans being composed, all of whose validity must be tested. Notice that users become aware of intersection rules only if their plans are invalid.

After actions are inherited, the plan at each rule to which actions have been inherited must be checked for validity. These rules are (potentially) NEW, all descendants of NEW, and all INTER rules of NEW and its siblings.

Thus, as shown in FIG. 7, rule analysis module 400 compares NEW, CHILD and INTER conditions with conditions from existing rules OLD at step 402. If a NEW, CHILD or INTER condition and OLD condition are the same, or simultaneous, at step 404, the agent manager determines if the actions of NEW, CHILD or INTER and OLD conflict (as previously discussed). If they do conflict, the NEW or INTER plan is invalid, and rule analysis module 400 moves to the next plan at step 410. If all plans are analyzed, risk analysis module 400 returns. If not, rule analysis module 400 processes the next plan from NEW, CHILD or INTER.

At step 404, if the conditions of NEW, CHILD or INTER and OLD are not the same, the agent manager tests whether the conditions of NEW, CHILD or INTER and OLD intersect at step 414. If they do, the agent manager checks if the actions conflict at step 406. If the actions conflict, the NEW, CHILD or INTER plan is invalid at step 408, and rule analysis module 400 moves to the next plan. If at step 414 the conditions of NEW, CHILD or INTER and OLD do not intersect, the plan is considered valid at step 412.

Figure 8:
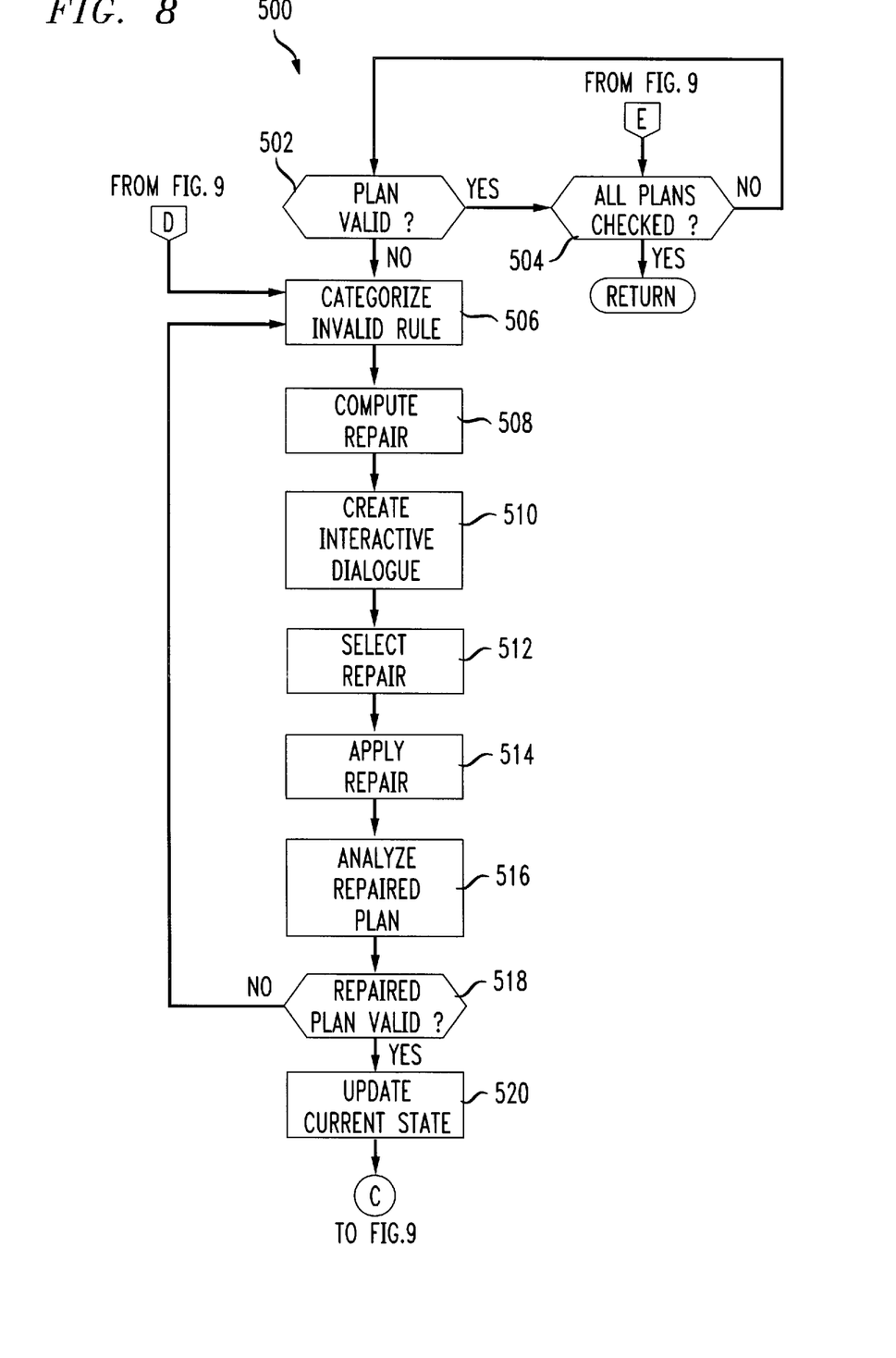
FIG. 8 is a flow diagram of a first portion of a rule repair module used in accordance with one embodiment of the invention.

FIG. 8 is a flow diagram of a first portion of a rule repair module used in accordance with one embodiment of the invention. When the agent manager detects that a rule has an invalid plan at step 502, it attempts to categorize the rule as one of a pre-defined set of invalid rule types at step 506. For example, the intersection of a rule that files messages by sender (e.g., "move messages from Tom to the folder Tom-Mail") and a rule that files messages by subject (e.g., "move messages with the subject 'RDDI' to the folder RDDI-Project") constitutes a common type of problem. The benefit of categorizing problems is that multiple instances of a given category may occur as a user works, and the user may specify that all problems of a particular category should be repaired in the same way.

When an action in a plan does not apply, the agent manager computes repairs at step 508, and generates an interactive dialogue that explains why the action does not apply and suggests repairs to the plan that will enable the action at step 510. How the agent manager computes repairs for a rule at step 508, and creates the interactive dialogue at step 510, is described in more detail as follows.

The dialogue contains a component for each unsatisfied precondition of the action. The text is created by composing templates associated with actions, preconditions and plan modification operators. If a precondition was deleted by a previous action in the plan, the system looks for alternative actions whose add list is a superset of the defeating action and whose delete list does not contain the unsatisfied precondition. Consider the rule formed from the intersection of:

---
messageType = email and
sender = Julia-Hirschberg
==> Move Message "julia", and
messageType = email and
subject contains "important"
==> Move Message "important".
---

The two "Move Message" actions conflict with each other, since each deletes "Inspool" from the current state, and "InSpool" is a precondition of all actions. Since "Copy Message" adds the same facts as "Move Message" (the message is filed), but does not delete "InSpool," substituting "Copy Message" for "Move Message" actions would result in a valid plan. The agent manager would prompt the user as follows:

---
"Move Message" does not apply because of the
effect of a previous "Move Message" action was
to move the message out of the mail spool --
you can take care of this by replacing the
previous "Move Message" action by "Copy
Message".
Do It
---

If no action in the plan defeated an unsatisfied precondition, the system looks for actions that satisfy the precondition and do not defeat any other actions in the plan. Consider the rule:

---
messageType = Message
==> Play Greeting "Greeting 1".
---

"Play Greeting" applies only to telephone calls, and only after a call has been picked up. Since the action "Pickup-Call" results in the call being picked up, inserting it into the plan would repair the second problem. The following message would be given to the user:

---
"Play Greeting" does not apply because
1) the current message is not a Telephone Call
-- you can take care of this by selecting the
Message Type Telephone Call
Do It
2) the call has not yet been picked up -- you
can take care of this by inserting the action
"Pickup Call" before "Play Greeting"
Do It
---

The algorithm for computing repairs is thus:

---
For each unsatisfied Action A
    For each unsatisfied precondition P
    If ∃ in plan before A, and B deletes P
    Then Repairs = {B' such that B'.add ⊇ B.add &
                          P ⊃ B'.delete}
    Else Repairs = {B' such that P ∈ B'.add & B'
                        can apply before A & B' does
                        not defeat any later actions}
---

The agent manager visually indicates rules with invalid plans and problematic actions in each plan. A user may access the repair dialogue associated with an action by clicking on the action. After the user selects a repair, the system applies the repair, checks the validity of the plan again to see whether the status of any other actions has changed, and updates the repair dialogue to show the new status of the plan.

Returning to the operation of FIG. 8, the user selects a repair at step 512, and the agent manager applies the selected repair at step 514. The repaired plan is analyzed to ensure its validity at step 515, using rule analysis module 400 described previously. If the repaired plan is valid at step 518, the current state for the repaired plan is updated at step 520. If the repaired plan is not valid at step 518, the agent manager generates another repair.

Figure 9:
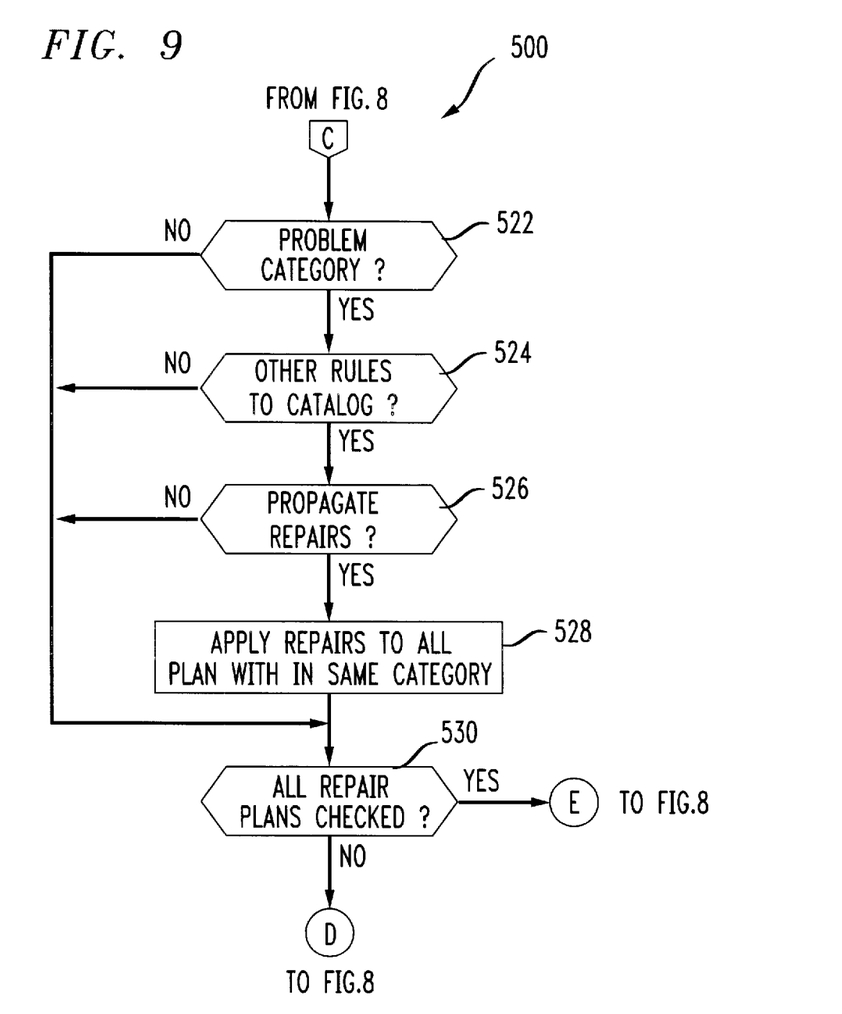
FIG. 9 is a flow diagram of a second portion of a rule repair module used in accordance with one embodiment of the invention.

FIG. 9 is a flow diagram of a second portion of a rule repair module used in accordance with one embodiment of the invention. If the repaired plan is valid at step 518, the agent manager checks whether the rule was a member of a problem category at step 522, and whether other rules also belong to the same category at step 524. In such cases, the agent manager asks whether the user wants to propagate the same repairs to all other rules in the category at step 526, and if so, applies the repairs to all plans within the same problem category at step 528. Once all the repaired plans are checked at step 530, the agent manager checks if all plans are checked at step 504 (shown in FIG. 8), and if so, returns. If not, the agent manager repairs the next plan. If all repaired plans are not checked at step 530, the agent manager processes the next repaired plan.

It can be appreciated by one skilled in the art that any software programs, schemes, steps or algorithms described herein with reference to an embodiment of the invention can be implemented in either hardware or software. If implemented in software, these software programs, schemes, steps or algorithms can be implemented on any general purpose computer, such as a personal computer, or special purpose computer, such as a digital signal processor (DSP), having at a minimum a processor with sufficient processing speed, and a computer readable medium such as read-only memory (ROM), programmable ROM (PROM), erasable programmable ROM (EPROM), random access memory (RAM), hard drive, optical drive, floppy disk, and so forth.

Conclusion

Although a preferred embodiment is specifically illustrated and described herein, it will be appreciated that modifications and variations of the present invention are covered by the above teachings and within the purview of the appended claims without departing from the spirit and intended scope of the invention. For example, although the rule hierarchy is defined using CLASSIC, it can be appreciated that any mechanism for creating structured descriptions of sets of objects and individual objects falls within the scope of the invention. Another example is the rule editor used by rule edit module 200, and shown in FIG. 3. It can be appreciated that any editor allowing the definition of conditions, attributes and actions, or combinations thereof, falls within the scope of the invention.

What is claimed is:

1. A method for a user to program a personal software agent using an agent manager, wherein said agent manager is connected to an input device for receiving instructions from the user, comprising the steps of:
    creating a rule to control the personal software agent;
    placing said rule in a hierarchical order of rules to control the personal software agent;
    determining whether said rule conflicts with another rule within said hierarchical order; and
    suggesting repairs to said rule if said rule conflicts with another rule.

2. The method described in claim 1, wherein the user creates said rule by defining conditions, attributes and actions of said rule.

3. The method described in claim 2, wherein said hierarchical order is comprised of parent rules, child rules, sibling rules, and inter rules.

4. The method described in claim 3, wherein said rule is placed in said hierarchical order using CLASSIC.

5. A method for a user to program a personal software agent using an agent manager, wherein said agent manager is connected to an input device for receiving instructions from the user, comprising the steps of:
    creating a rule by defining said rule's conditions, attributes and actions;
    placing said rule in an hierarchical order comprised of parent rules, child rules, sibling rules, and inter rules, wherein said rule inherits actions from said parent rules, wherein said child rules inherit actions from said rule, and said inter rules inherit actions from the intersection of said rule and said sibling rules;
    determining whether said rule is valid within said hierarchical order; and
    suggesting repairs to said rule if said rule is invalid.

6. The method described in claim 5, wherein said rule is placed in said hierarchical order using CLASSIC and CLASSIC determines subsumption relations among rules.

7. The method described in claim 6, wherein CLASSIC determines intersections among rules.

8. The method described in claim 7, wherein said action is defined in terms of preconditions, add list and delete list for said action.

9. The method described in claim 8, wherein said rule is repaired using an interactive dialogue explaining why said action does not apply and suggesting repairs to said rule that will enable said actions.

10. The method described in claim 9, wherein said invalid rule is categorized according to why said rule is invalid.

11. The method described in claim 10, wherein repairs applied to said invalid rule are applied to rules in the same category as said invalid rule.

12. An agent manager for a personal software agent, the agent manager having an input device for receiving instructions from a user, comprising:
    a rule edit module having a rule edit input coupled to the input device for receiving instructions from the user for creating a rule to control the personal software agent and having a rule edit output;
    a rule index module having a rule index input coupled to said rule edit output for receiving said rule and placing said rule in a hierarchical order of rules to control the personal software agent, and having a rule index output;
    a rule analysis module having a rule analysis input coupled to said rule index output for receiving said hierarchical order and using said hierarchical order for determining whether said rule conflicts with another rule in the hierarchical order, and having a rule analysis output; and
    a rule repair module having a rule repair input coupled to said rule analysis output to receive said rule if said rule conflicts with another rule in the hierarchical order in order to guide the user in selecting and applying repairs to avoid the conflict.

13. The agent manager described in claim 12, wherein said rule edit module allows the user to enter conditions, attributes and actions to define said rule.

14. The agent manager described in claim 13, wherein said hierarchical order is comprised of parent rules, child rules, sibling rules, and inter rules.

15. The agent manager described in claim 14, wherein said rule index module permits the user to create structured descriptions of sets of objects and individual objects.

16. The agent manager described in claim 15, wherein said rule index module represents said rule using CLASSIC.

17. An agent manager for a personal software agent, the agent manager having an input device for receiving instructions from a user, comprising:

a rule edit module having a rule edit input coupled to the input device for receiving instructions from the user for creating a rule by entering conditions, attributes and actions to define said rule, and having a rule edit output;

a rule index module having a rule index input coupled to said rule edit output for receiving said rule and placing said rule in a hierarchical order comprised of parent rules, child rules, sibling rules, and inter rules to create structured descriptions of sets of objects and individual object, and having a rule index output and wherein said rule index module inherits actions from said parent rules to said rule, inherits actions from said rule to said child rules, and inherits actions from the intersection of said rule and said sibling rules to said inter rules;

a rule analysis module having a rule analysis input coupled to said rule index output for receiving said hierarchical order and using said hierarchical order for determining whether said rule is valid, and having a rule analysis output; and a rule repair module having a rule repair input coupled to said rule analysis output to receive said rule if said rule is invalid in order to guide the user in selecting and applying repairs to make the rule valid.

18. The agent manager described in claim 17, wherein said rule index module determines subsumption relations among rules.

19. The agent manager described in claim 18, wherein said rule index module determines intersections among rules.

20. The agent manager described in claim 19, wherein said action is defined in terms of preconditions, add list and delete list for said action.

21. The agent manager described in claim 20, wherein said rule repair module creates an interactive dialogue explaining why said action does not apply and suggests repairs to said rule that will enable said actions.

22. The agent manager described in claim 21, wherein said rule repair module categorizes invalid plans according to why said plans are invalid.

23. The agent manager described in claim 22, wherein said rule repair module applies said repairs to rules in the same category as said invalid rule.

24. Apparatus for automatically verifying whether a new rule which is to be added to a set of rules to control a personal software agent is valid with respect to the set of rules, each rule specifying a set of conditions and a sequence of actions being interpreted in a system which causes the actions specified in the rule to be performed when the conditions specified in the rule are satisfied, the apparatus comprising:

a stored subsumption hierarchy of the rules in the set of rules;

means for placing the new rule to control the personal software agent in the subsumption hierarchy; and means for using the subsumption hierarchy which includes the new rule to determine whether the new rule conflicts with another rule in the hierarchy and provide an indication when a conflict exists, wherein the means for using the subsumption hierarchy further uses the subsumption hierarchy to determine a suggested correction for the new rule when the new rule conflicts with another rule and provide the suggested correction.

25. The apparatus described in claim 24, further comprising means responsive to an input from a user of the apparatus indicating acceptance of the suggested correction for correcting the new rule according to the suggested correction.

26. Apparatus for automatically verifying whether a new rule which is to be added to a set of rules is valid with respect to the set of rules, each rule specifying a set of conditions and a sequence of actions being interpreted in a system which causes the actions specified in the rule to be performed when the conditions specified in the rule are satisfied, the apparatus comprising:

a stored subsumption hierarchy of the rules in the set of rules;

means for placing the new rule in the subsumption hierarchy;

means for using the subsumption hierarchy which includes the new rule to determine whether the new rule is valid, and provide an indication of invalidity when the new rule is not valid and further using the subsumption hierarchy to determine a suggested correction for the new rule when the new rule is not valid and provide the suggested correction, wherein the means for using the subsumption hierarchy determines whether the new rule is valid by using the subsumption hierarchy to determine whether the conditions of the new rule and another rule of the set of rules can apply simultaneously and if the conditions do so apply, analyzing the actions of the rules for conflicts; and comprising means responsive to an input from a user of the apparatus indicating acceptance of the suggested correction for correcting the new rule according to the suggested correction.

27. The apparatus described in claim 26, wherein the means for using the subsumption hierarchy determines whether the conditions of the new rule and another rule can apply simultaneously by using the subsumption hierarchy to determine whether the condition of one of the rules is more general than the condition of the other or whether the condition of one of the rules intersects with the condition of the other of the rules.

28. The apparatus described in claim 27, wherein the means for using the subsumption hierarchy further uses the subsumption hierarchy to determine a category for a suggested correction which has been accepted and find other rules which require corrections belonging to the category.

29. The apparatus described in claim 28, wherein the means for placing the new rule in the subsumption hierarchy does so each time the new rule is altered.

30. Interactive rule editing apparatus for editing a rule which is to be added to a set thereof, each rule specifying a condition and an action and being interpreted in a system which causes the action specified in the rule to be performed when the condition specified in the rule is satisfied, the interactive rule editing apparatus comprising:

input means;

output means;

means for determining whether the rule to be added to control the personal software agent conflicts with another rule with regard to the set thereof and if the rule to be added does conflict, providing a suggested correction;

means for altering the rule; and wherein the input means receives the rule to be added and provides the rule to be added to the means for determining;

the output means receives the suggested correction and outputs the suggested correction;

the input means receives an indication that the suggested correction has been accepted; and the means for altering the rule responds to the indication by altering the rule to be added in accordance with the suggested correction.

* * * * *

(12) EX PARTE REEXAMINATION CERTIFICATE (9857th)
United States Patent
Murray et al.

(10) Number: US 5,809,492 C1
(45) Certificate Issued: Sep. 27, 2013

(54) APPARATUS AND METHOD FOR DEFINING RULES FOR PERSONAL AGENTS

(75) Inventors: LaTondra Alyce Murray, Raleigh, NC (US); Loren Gilbert Terveen, Basking Ridge, NJ (US)

(73) Assignee: AT&T Intellectual Property II, L.P., Reno, NV (US)

Reexamination Request:
No. 90/011,367, Dec. 3, 2010

Reexamination Certificate for:
Patent No.: 5,809,492
Issued: Sep. 15, 1998
Appl. No.: 08/769,694
Filed: Dec. 18, 1996

Related U.S. Application Data (60) Provisional application No. 60/015,070, filed on Apr. 9, 1996.

(51) Int. Cl.
*G06N 5/02* (2006.01)

(52) U.S. Cl.
USPC .................................................. 706/45; 706/60

(58) Field of Classification Search
None
See application file for complete search history.

(56) References Cited

To view the complete listing of prior art documents cited during the proceeding for Reexamination Control Number 90/011,367, please refer to the USPTO's public Patent Application Information Retrieval (PAIR) system under the Display References tab.

*Primary Examiner* — Cameron Saadat (57) ABSTRACT

An apparatus and method for a user to program a personal software agent using an agent manager. The agent manager receives instructions for creating a rule. The rule is placed in a hierarchical order. A determination is made as to whether the rule is valid within the hierarchical order. If the rule is not valid, repairs are suggested to make the rule valid.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 12, 13 and 24-27 is confirmed.

Claim 30 is determined to be patentable as amended.

New claims 31-45 are added and determined to be patentable.

Claims 3-11, 14-23, 28 and 29 were not reexamined.

30. Interactive rule editing apparatus for editing a rule which is to be added to a set *of rules* thereof, each rule specifying a condition and an action and being interpreted in a system which causes the action specified in the rule to be performed when the condition specified in the rule is satisfied, the interactive rule editing apparatus comprising:
   input means;
   output means;
   means for determining whether the rule to be added to control the personal software agent conflicts with another rule with regard to the set *of rules* thereof and if the rule to be added does conflict, providing a suggested correction;
   means for altering the rule; and wherein
      the input means receives the rule to be added and provides the rule to be added to the means for determining;
      the output means receives the suggested correction and output the suggested correction;
      the input means receives an indication that the suggested correction has been accepted; [and]
      the means for altering the rule responds to the indication by altering the rule to be added in accordance with the suggested correction*; and*
      *the set of rules comprises a plurality of rules having a determined order among the plurality of rules, in which an added rule is placed at a determined position within the determined order among the plurality of rules prior to determining whether a conflict exists with another rule in the set of rules.*

*31. The method described in claim 1, wherein said rule placed in the hierarchical order of rules is created in response to at least one action by the user using a graphical user interface.*

*32. The method describe in claim 31, wherein rule conditions and rule actions are specified in creating said rule using the graphical user interface.*

*33. The method described in claim 31, wherein said rule is placed in the hierarchical order of rules at a determined position in the hierarchical order of rules.*

*34. The method described in claim 33, wherein the graphical user interface presents a conflict display when said rule placed in the hierarchical order of rules conflicts with another rule in the hierarchical order of rules.*

*35. The method described in claim 31, wherein the graphical user interface visually displays at least one selectable icon on the graphical user interface for creating said rule.*

*36. The method described in claim 1, wherein a previously existing rule in the hierarchical order of rules is deleted in response to at least one action by the user using a graphical user interface.*

*37. The method described in claim 1, wherein a previously existing rule in the hierarchical order of rules is edited in response to at least one action by the user using a graphical user interface.*

*38. The method described in claim 37, wherein when a previously existing rule in the hierarchical order of rules is edited a previous position of the previously existing rule in the hierarchical order of rules is reevaluated and a new position of the hierarchical order of rules is determined.*

*39. The method described in claim 32, wherein the graphical user interface presents an interactive dialogue during a creation of said rule.*

*40. The method described in claim 37, wherein the graphical user interface presents an interactive dialogue during editing of a previously existing rule in the hierarchical order of rules.*

*41. The method described in claim 39, wherein the interactive dialogue includes templates displayed on the graphical user interface.*

*42. The method described in claim 1, wherein the method is executed using a personal computing device that includes a graphical user interface, and a memory that stores the hierarchical order of rules.*

*43. The apparatus of claim 30, wherein the interactive rule editing apparatus comprises a general purpose computer.*

*44. The apparatus of claim 30, wherein the interactive rule editing apparatus comprises a personal computer.*

*45. The apparatus of claim 30, wherein the input means includes a display providing a graphical user interface.*

\* \* \* \* \*